(12) United States Patent
Bao et al.

(10) Patent No.: US 9,695,289 B1
(45) Date of Patent: Jul. 4, 2017

(54) BULK MOLDING COMPOUND-BASED PET BOWL

(71) Applicant: Doskocil Manufacturing Company, Inc., Arlington, TX (US)

(72) Inventors: Zeng Yi Bao, Zhongshan (CN); Tian Le Yang, Zhongshan (CN); Sunil Pinto, Arlington, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 15/070,057

(22) Filed: Mar. 15, 2016

(51) Int. Cl.
| | |
|---|---|
| *A01K 5/01* | (2006.01) |
| *B29C 43/00* | (2006.01) |
| *C08J 5/04* | (2006.01) |
| *C08K 3/26* | (2006.01) |
| *A01K 7/00* | (2006.01) |
| *B29C 43/52* | (2006.01) |
| *B29C 37/02* | (2006.01) |
| *B29C 43/02* | (2006.01) |
| *B29K 105/00* | (2006.01) |
| *B29K 67/00* | (2006.01) |
| *B29K 309/08* | (2006.01) |
| *B29K 509/00* | (2006.01) |
| *B29L 31/00* | (2006.01) |

(52) U.S. Cl.
CPC ............ *C08J 5/043* (2013.01); *A01K 5/0114* (2013.01); *A01K 7/005* (2013.01); *B29C 37/02* (2013.01); *B29C 43/003* (2013.01); *B29C 43/021* (2013.01); *B29C 43/52* (2013.01); *C08K 3/26* (2013.01); *B29K 2067/00* (2013.01); *B29K 2105/0032* (2013.01); *B29K 2309/08* (2013.01); *B29K 2509/00* (2013.01); *B29K 2995/007* (2013.01); *B29L 2031/7132* (2013.01); *C08J 2367/06* (2013.01); *C08K 2003/265* (2013.01)

(58) Field of Classification Search
CPC ..... C04B 28/00; B29C 43/003; B29C 51/082; A01K 5/01; A01K 5/0114
USPC ....... 119/61.5; 425/110; 206/819, 524.3, 524
See application file for complete search history.

(56) References Cited

U.S. PATENT DOCUMENTS

| | | | | |
|---|---|---|---|---|
| 4,053,346 A | * | 10/1977 | Amberg | B29C 47/0026 156/446 |
| 4,076,780 A | * | 2/1978 | Ditto | B29C 43/58 264/294 |
| 4,211,686 A | * | 7/1980 | Nishikawa | C08K 13/04 523/513 |
| 4,925,718 A | * | 5/1990 | Tsujimoto | B32B 5/00 428/121 |
| 5,412,003 A | * | 5/1995 | Akiyama | C08K 7/28 428/430 |

(Continued)

*Primary Examiner* — Yvonne Abbott-Lewis
(74) *Attorney, Agent, or Firm* — Global IP Counselors, LLP (57) ABSTRACT

A bowl includes a body portion. The body portion is formed from a material comprising a bulk molding compound. The bulk molding compound includes a polyester resin, glass fiber and calcium carbonate. A method for forming a bowl includes providing a composition comprising a bulk molding compound, providing the composition in a cavity of a mold including a male die member and a female die member, and compressing the male die member and the female die member under heat to form a molded material. The bulk molding compound includes a polyester resin, glass fiber and calcium carbonate.

15 Claims, 7 Drawing Sheets

(56) References Cited

U.S. PATENT DOCUMENTS

| | | | | |
|---|---|---|---|---|
| 5,595,029 A * | 1/1997 | Revoir | ................. | E04H 13/003 |
| | | | | 40/124.5 |
| 5,665,439 A * | 9/1997 | Andersen | ................. | B32B 5/02 |
| | | | | 106/400 |
| 5,705,239 A * | 1/1998 | Andersen | ............ | B28B 23/0087 |
| | | | | 206/524.1 |
| 5,738,921 A * | 4/1998 | Andersen | ............ | B05B 11/0037 |
| | | | | 206/524.3 |
| 5,800,759 A * | 9/1998 | Yamazaki | ......... | B29C 45/14008 |
| | | | | 264/163 |
| 5,972,272 A * | 10/1999 | Nagase | ................... | B29C 70/50 |
| | | | | 264/320 |
| 6,083,339 A * | 7/2000 | Peters | ................... | B29C 51/002 |
| | | | | 156/245 |
| 6,315,150 B1 * | 11/2001 | Takai | ...................... | B29C 51/04 |
| | | | | 220/608 |
| 7,481,645 B2 * | 1/2009 | Helou, Jr. | ................. | A21B 3/13 |
| | | | | 425/210 |
| 8,284,025 B2 * | 10/2012 | Beenau | ................ | G06Q 20/382 |
| | | | | 340/10.1 |

* cited by examiner

BULK MOLDING COMPOUND-BASED PET BOWL

BACKGROUND

Field of the Invention

The present invention generally relates to a pet bowl formed of a bulk molding compound. More specifically, the present invention relates to a pet bowl including a body portion formed of a bulk molding compound. The bulk molding compound-based pet bowl has an improved strength and durability over conventional pet bowls and can be used in a microwave or dishwasher without being damaged.

Background Information

Conventional pet bowls are formed from melamine resin. Melamine resin is a synthetic polymer that is formed by combining the organic compound melamine with formaldehyde and polymerizing the melamine-formaldehyde compound to produce a plastic material that can be molded into a desired shape. Melamine resin is desirable for use in bowls such as pet bowls because it can be easily molded while warm and is heat resistant.

SUMMARY

It has been found that bowls formed with melamine resin are very brittle and cannot be used in a microwave due to chemical degradation. Melamine resin bowls also suffer damage after repeated use in a dishwasher. Furthermore, several animal and infant foods have been recalled due to melamine contamination, and some have raised concerns whether bowls formed of melamine resin could also cause health problems due to the melamine "leaching" into food placed in the bowls.

Therefore, there is a need for a pet bowl that has a high impact resistance and strength and is microwave-safe. There is also a need for a pet bowl that is not formed of a melamine-based material. It has been found that bulk molding compound is suitable for pet bowls.

Bulk molding compound is a high impact resistance thermoset polymer material formed of polyester resin reinforced with glass fiber. Bulk molding compound is primarily used in injection and compression molding for industrial applications such as automotive and transit applications, appliances and electrical applications. It has been discovered that a pet bowl formed of a bulk molding compound has an unexpectedly improved durability. In view of the state of the known technology, one aspect of the present disclosure is to provide a bowl including a body portion. The body portion is formed from a material comprising a bulk molding compound. The bulk molding compound includes a polyester resin, glass fiber and calcium carbonate.

Another aspect of the present disclosure is to provide a method for forming a bowl. The method includes providing a composition comprising a bulk molding compound, providing the composition in a cavity of a mold comprising a male die member and a female die member, and compressing the male die member and the female die member under heat to form a molded material. The bulk molding compound comprises a polyester resin, glass fiber and calcium carbonate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-5, a pet bowl 1 including a body portion 2 is illustrated in accordance with a first embodiment. The body portion 2 can include a lip 3 and bottom 4.

The body portion 2 is formed of bulk molding compound. The bulk molding compound includes an unsaturated polyester resin and glass fiber. The bulk molding compound may also include fillers such as calcium carbonate. The bulk molding compound preferably includes 25% by weight of unsaturated polyester resin, 15% by weight of glass fiber, and 60% by weight of calcium carbonate as a filler. The bulk molding compound may be a solid fibrous composition. For example, a bulk molding compound manufactured by Bulk Molding Compounds, Inc. may be used as the bulk molding compound.

The body portion 2 may also be formed of additional materials such as pigments or other additives. For example, a pigment may be added to the bulk molding compound to change the color of the body portion 2. Other additives may also be used to alter the appearance or properties of the body portion 2.

The body portion 2 may have a granite-like appearance due to processing of the bulk molding compound. For example, bulk molding compound is a highly decorative resin. Therefore, the appearance of the body portion 2 can be adjusted by changing the processing conditions of the bulk molding compound.

Figure 1:
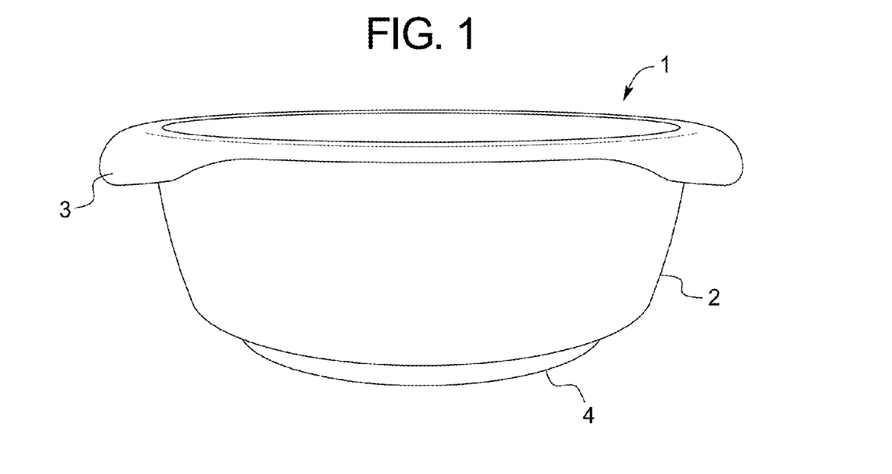
FIG. 1 is a top perspective view of a bowl formed of a bulk molding compound according to an embodiment.
Figure 2:
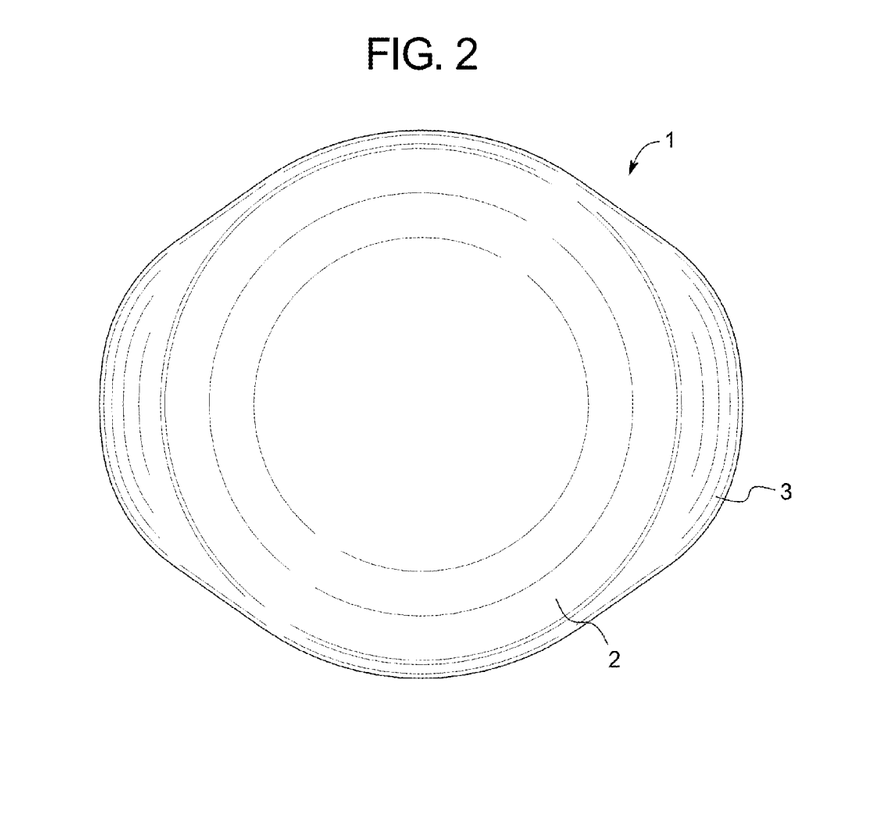
FIG. 2 is a top view of the bowl shown in FIG. 1.
Figure 3:
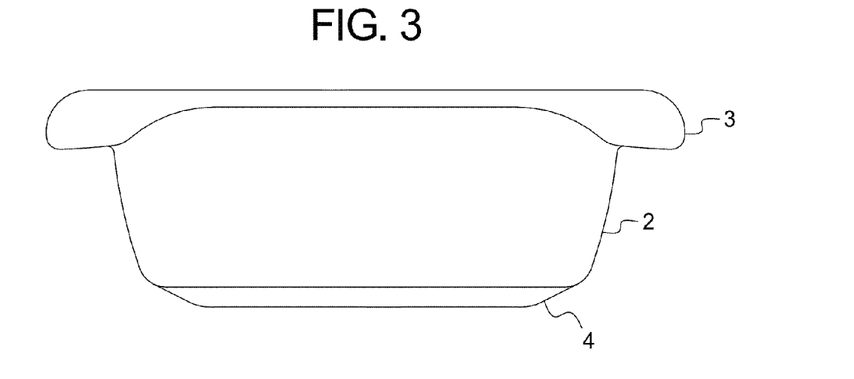
FIG. 3 is a front view of the bowl shown in FIG. 1
Figure 4:
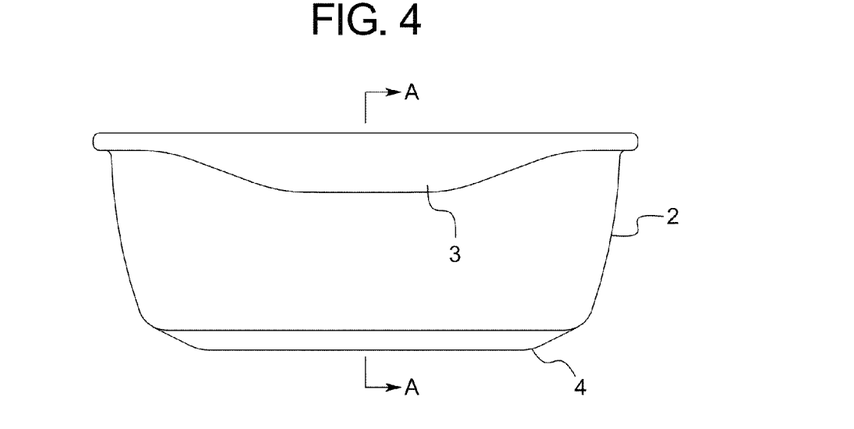
FIG. 4 is a side view of the bowl shown in FIG. 1.
Figure 5:
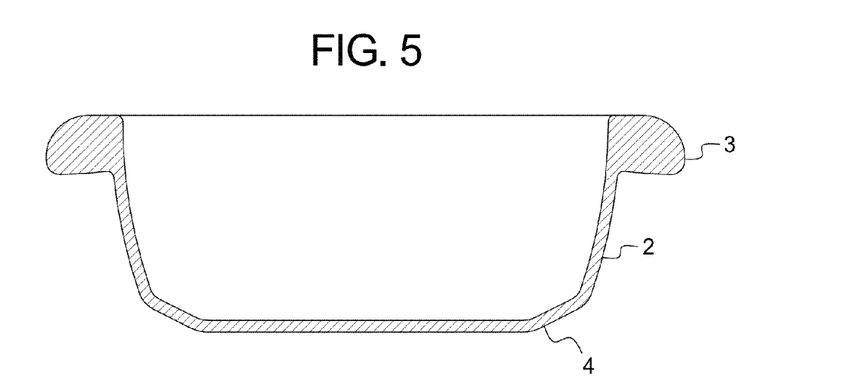
FIG. 5 is a cross-sectional view of the bowl shown in FIG. 4 taken along section line A-A.
Figure 6:
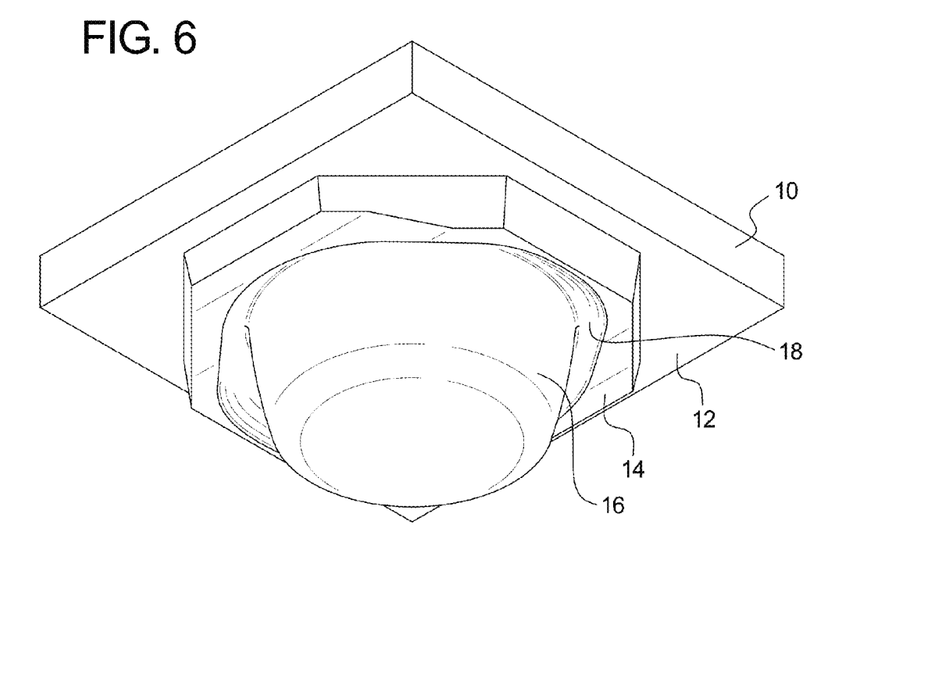
FIG. 6 is a bottom perspective view of a male die member used in a method of forming a bowl according to an embodiment.
Figure 7:
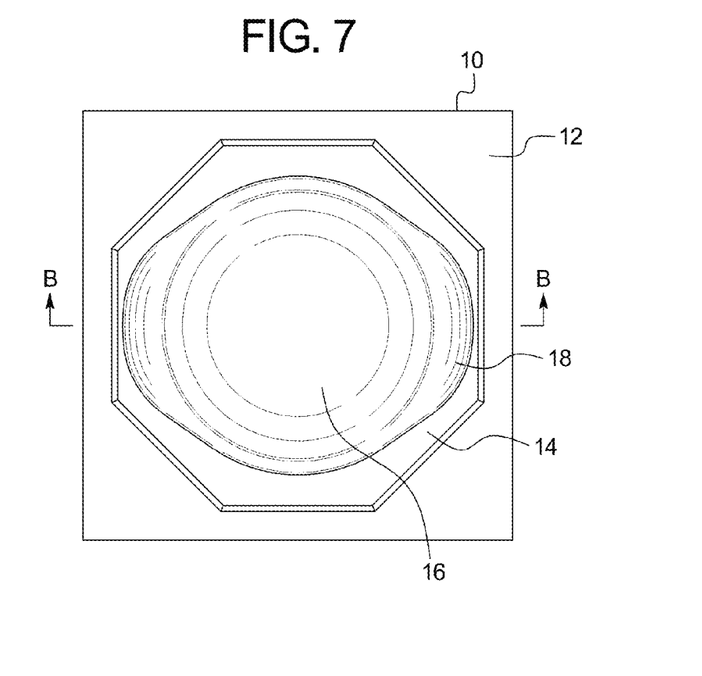
FIG. 7 is a is a bottom view of the male die member shown in FIG. 6.
Figure 8:
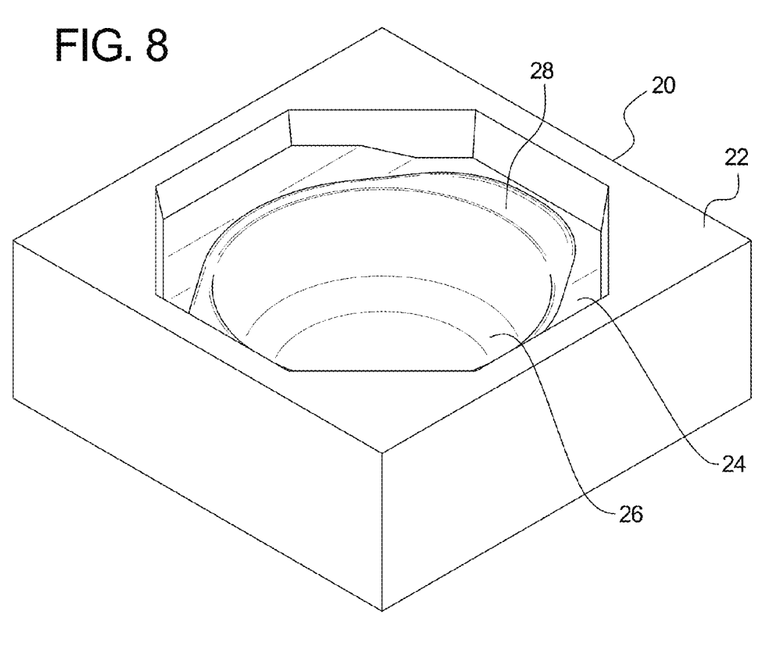
FIG. 8 is a top perspective view of a female die member used in a method of forming a bowl according to an embodiment.
Figure 9:
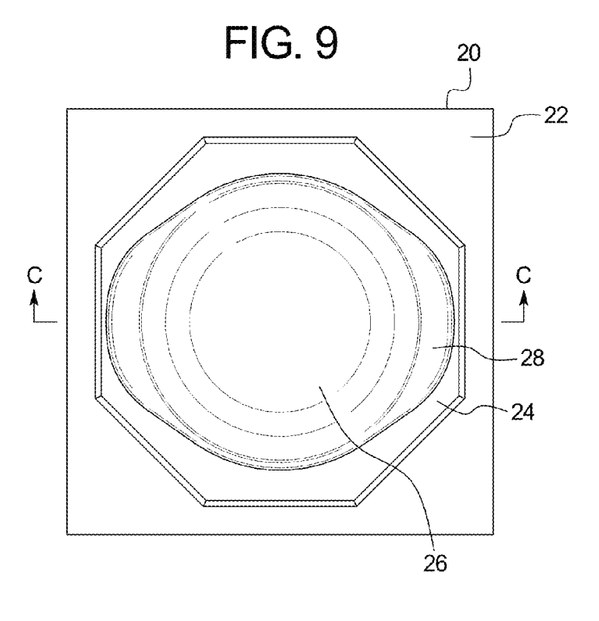
FIG. 9 is a top view of the female die member shown in FIG. 8.
Figure 10:
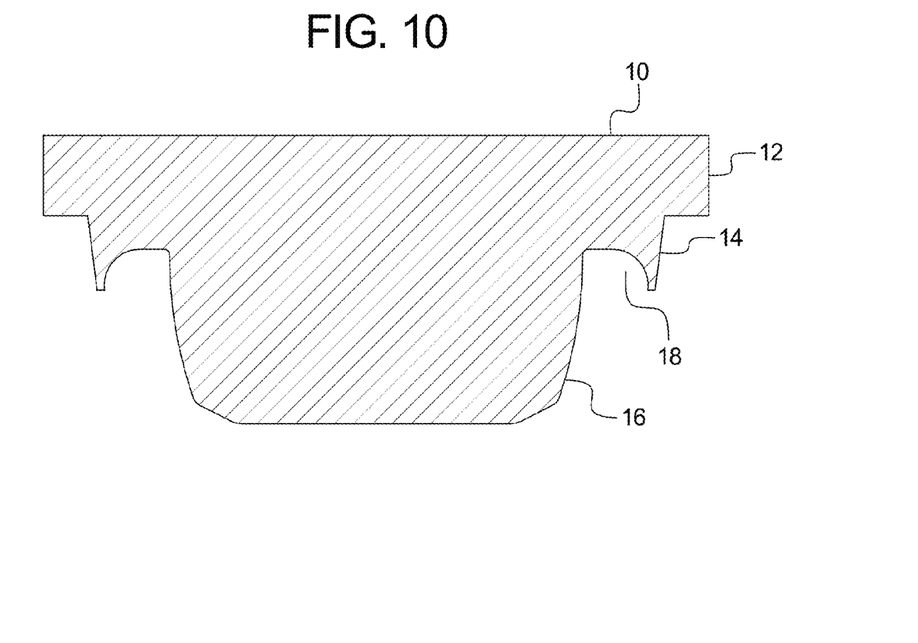
FIG. 10 is a cross-sectional view of the male die member shown in FIG. 7 taken along section line B-B.

The pet bowl is formed using a mold including a male die member 10 and a female die member 20 as shown in FIGS. 6-11. As shown in FIGS. 6-7 and 10, the male die member 10 includes a base plate 12, a supporting plate 14, a molding surface 16 and a cavity 18. The molding surface 16 and cavity 18 together have substantially the same shape as the body portion of the pet bowl and are used to shape a material placed into the mold. For example, the cavity 18 has substantially the same shape as the lip 3 of the body portion 2, and molding surface 16 has substantially the same shape as the portion of the body portion 2 other than the lip 3.

The components of the male die member 10 may be formed of any suitable material known in the art. For example, the base plate 12 and supporting plate 14 may each be formed of one or more metal materials. The metal material(s) used to form the base plate 12 may be the same as or different from the material material(s) used to form the supporting plate 14. The molding surface 16 and cavity 18 may each be formed of one or more metal materials. It will be apparent to those skilled in the art from this disclosure that the components of the male die member 10 can be formed of any material that is suitable for compression molding a bulk molding compound material in accordance with the present invention.

Figure 11:
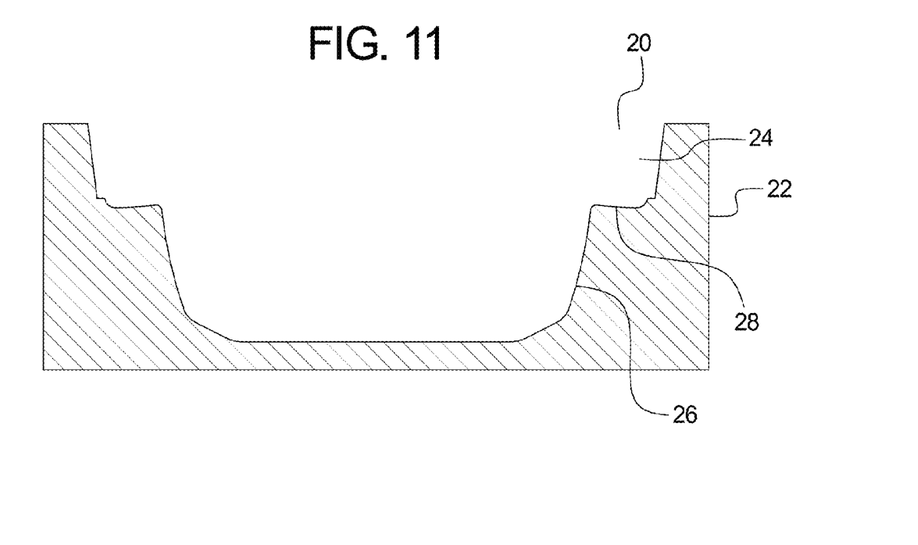
FIG. 11 is a cross-sectional view of the female die member shown in FIG. 9 taken along section line C-C.

As shown in FIGS. 8-9 and 11, the female die member 20 includes a base plate 22, a first cavity 24, a second cavity 26 and a third cavity 28. The first cavity 24 has substantially the same shape as the supporting plate 12 of the male die member 10 such that the supporting plate 12 of the male die member 10 is configured to mate with the first cavity 24 during compression molding. The second cavity 26 has substantially the same shape as the molding surface 16 of the male die member 10 such that the molding surface 16 of the male die member 10 is configured to mate with the second cavity 26 during compression molding. The third cavity 28 has substantially the same shape as the cavity 18 of the male die member 10 such that the cavity 18 of the male die member 10 is configured to mate with the third cavity 28 during compression molding.

The components of the female die member 20 may be formed of any suitable material known in the art. The components of the female die member 20 may be formed of the same material(s) as the male die member 10. For example, the base plate 22, the first cavity 24, the second cavity 26 and the third cavity 28 may each be formed of one or more metal materials. It will be apparent to those skilled in the art from this disclosure that the components of the female die member 20 can be formed of any material that is suitable for compression molding a bulk molding compound material in accordance with the present invention.

Figure 12:
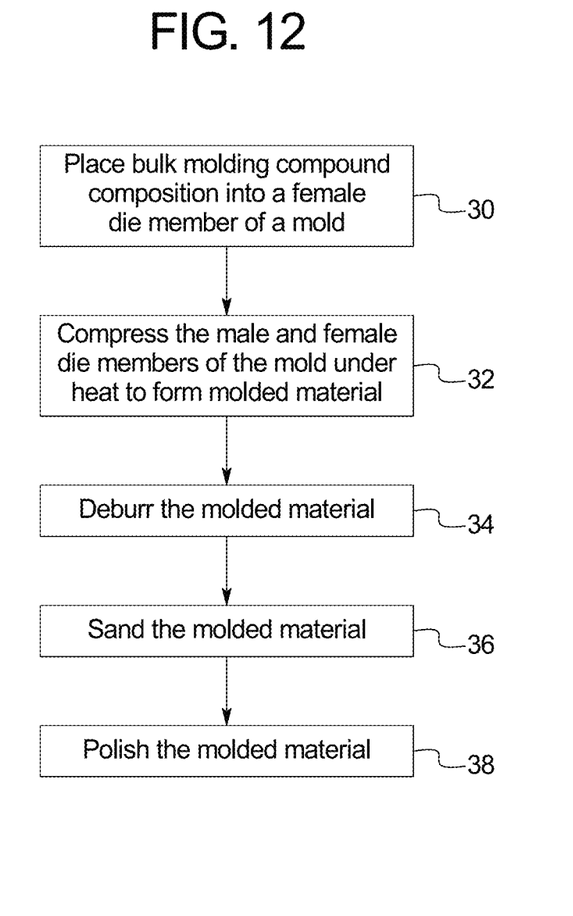
FIG. 12 is a flow chart illustrating a method for forming a bowl according to an embodiment.

A method for forming a pet bowl using a bulk molding compound in accordance with an embodiment is illustrated in FIG. 12. First, a material including a bulk molding compound is placed into a female die member of a mold in step 30. The female die member may be the female die member 20 illustrated in FIGS. 8-9 and 11 or may be any suitable female die member for forming a pet bowl using the material including the bulk molding compound. The material may consist of bulk molding compound or may optionally include pigments or other additives for altering or enhancing the characteristics of the pet bowl. The material may be a solid fibrous composition. The material may be packed in the mold or may be loosely placed in the mold.

In step 32, the female die member of step 30 and a male die member configured to mate with the female die member of step 30 are compressed under heat to form a molded material. The male die member may be the male die member 10 illustrated in FIGS. 6-7 and 10 or may be any other suitable male die member configured to mate with the female die member of step 30. The male and female die members in step 32 are compressed at a pressure ranging from 80 Ton to 180 Ton. The male and female die members are preferably compressed at an initial pressure of 80 Ton and a final pressure of 180 Ton. The male and female die members in step 32 are compressed at a temperature of approximately 180° C.

The molded material substantially has the shape of a pet bowl. In step 34, the molded material is deburred to smooth out the edges of the molded material and to remove any burrs remaining in the molded material after compression. The molded material may be deburred by hand using any suitable tool such as a razor. Alternatively, the molded material may be deburred using a deburring machine.

The molded material is then sanded as shown in step 36 to further smooth out the molded material. The skilled artisan would understand that the molded material may be sanded in any suitable manner to form a pet bowl according to the present invention. For example, the molded material may be sanded using a sander.

The molded material is then polished as shown in step 38 to form the finished pet bowl. The skilled artisan would understand that the molded material may be polished in any suitable manner to form a pet bowl according to the present invention. For example, the molded material may be polished using an abrasive material and a work wheel.

Figure 13A:
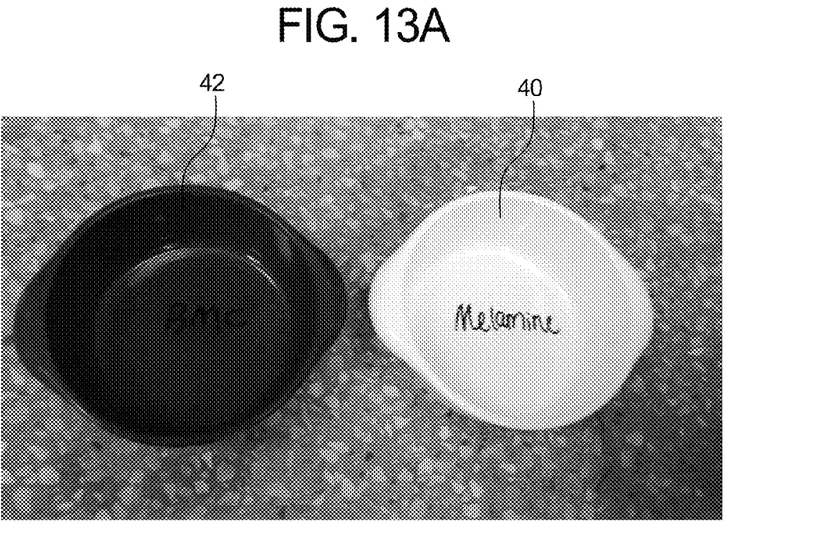
FIGS. 13A and 13B respectively show photos of pet bowls formed of melamine resin and bulk molding compound both before and after being dropped from a height of 30 inches.
Figure 13B:
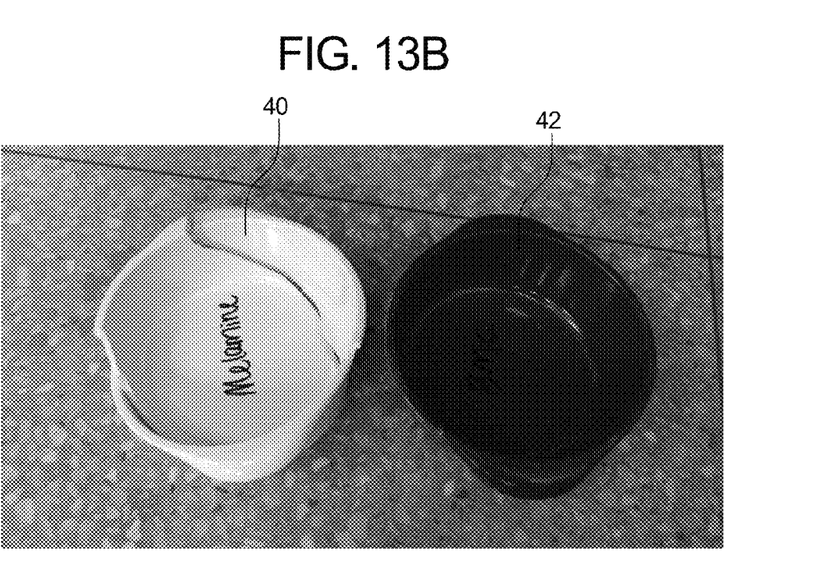

Pet bowls formed using a bulk molding compound exhibit an unexpected improvement in impact resistance and strength as compared with pet bowls formed using melamine resin. For example, FIGS. 13A and 13B show the results of an impact resistance test for both a pet bowl 40 formed of a melamine resin and a pet bowl 42 formed of a bulk molding compound. Pet bowl 40 was formed using A5 melamine resin. The melamine resin was compressed in a molding die at an initial pressure of 50 Ton, a final pressure of 180 Ton, and a temperature of 180° C. Pet bowl 42 was formed using a material including bulk molding compound BMC1000 sold by Bulk Molding Compounds, Inc. The bulk molding compound was compressed in a molding die at an initial pressure of 80 Ton, a final pressure of 180 Ton, and a temperature of 180° C. Pet bowls 40 and 42 have substantially the same shape as the pet bowl 1 shown in FIGS. 1-5.

FIG. 13A shows a photo of pet bowls 40 and 42 before the impact resistance test. In the impact resistance test, pet bowls 40 and 42 were each dropped onto a floor four times from a height of 30 inches. The first time, pet bowls 40 and 42 were dropped to the floor with their bottom surface facing the floor. The second time, pet bowls 40 and 42 were dropped to the floor with their top surface facing the floor. The third time, pet bowls 40 and 42 were dropped to the floor with a side surface having a lip facing the floor. After the third time, a small portion of pet bowl 40 broke off of the bowl. The fourth time, pet bowls 40 and 42 were dropped to the floor with a side surface not having a lip facing the floor. After the fourth time, pet bowl 40 broke into approximately three pieces, whereas pet bowl 42 was not cracked or broken.

FIG. 13B shows a photo of the pet bowls 40 and 42 after being dropped four times in the impact resistance test. As shown in FIG. 13B, pet bowl 40 formed of melamine resin is cracked and has broken into pieces, whereas pet bowl 42 is not cracked or shattered.

These results demonstrate that a bowl formed of a bulk molding compound exhibits an unexpected improvement in impact resistance or strength as compared to a bowl formed of a melamine resin.

It is widely known that bowls or dishes formed from melamine resin cannot be used safely in a microwave or an oven because the melamine is chemically degraded when subject to heat in a microwave or an oven. In contrast, the present inventors have discovered that a bowl formed of a bulk molding compound can be safely used in a microwave.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "component" or "element" when used in the singular can have the dual meaning of a single part or a plurality of parts. Accordingly, these terms, as utilized to describe the present invention should be interpreted relative to a pet bowl formed of a bulk molding compound.

The term "configured" as used herein to describe a component, section or part of a device means that the component, section or part is designed to carry out the desired function.

The terms of degree, such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A bowl comprising:
   a substantially round body portion including a bottom and a lip,
   the body portion being formed from a material comprising a bulk molding compound, the bulk molding compound comprising a polyester resin, glass fiber and calcium carbonate.

2. The bowl according to claim 1, wherein the polyester resin is an unsaturated polyester resin.

3. The bowl according to claim 2, wherein the bulk molding compound has a composition comprising approximately 25% by weight of the unsaturated polyester resin, approximately 15% by weight of the glass fiber, and approximately 60% by weight of calcium carbonate.

4. The bowl according to claim 1, wherein the material comprises a pigment.

5. The bowl according to claim 1, wherein the material consists of the bulk molding compound.

6. The bowl according to claim 1, wherein the material is deburred.

7. A method for forming a bowl comprising a body portion including a bottom and a lip, the method comprising:
   providing a composition comprising a bulk molding compound, the bulk molding compound comprising a polyester resin, glass fiber and calcium carbonate,
   providing the composition in a cavity of a mold comprising a male die member and a female die member, and
   compressing the male die member and the female die member under heat to form the body portion of the bowl.

8. The method according to claim 7, wherein the polyester resin is an unsaturated polyester resin.

9. The method according to claim 7, wherein the bulk molding compound has a composition comprising approximately 25% by weight of the unsaturated polyester resin, approximately 15% by weight of the glass fiber, and approximately 60% by weight of calcium carbonate.

10. The method according to claim 7, further comprising deburring the molded material.

11. The method according to claim 7, further comprising polishing the molded material.

12. The method according to claim 7, further comprising sanding the molded material.

13. The method according to claim 7, wherein the molded material consists of the bulk molding compound.

14. The method according to claim 7, wherein the composition comprises a pigment.

15. The method according to claim 7, wherein the composition is a solid fibrous composition.

* * * * *